United States Patent
Kumar et al.

(10) Patent No.: US 12,277,624 B2
(45) Date of Patent: Apr. 15, 2025

(54) GENERATING BLEND OBJECTS FROM OBJECTS WITH PATTERN FILLS

(71) Applicant: Adobe Inc., San Jose, CA (US)

(72) Inventors: Apurva Kumar, Patna (IN); Paranjay Sharma, Noida (IN)

(73) Assignee: Adobe Inc., San Jose, CA (US)

( * ) Notice: Subject to any disclaimer, the term of this patent is extended or adjusted under 35 U.S.C. 154(b) by 193 days.

(21) Appl. No.: 17/887,735

(22) Filed: Aug. 15, 2022

(65) Prior Publication Data

US 2024/0054695 A1 Feb. 15, 2024

(51) Int. Cl.
*G06T 11/00* (2006.01)
*G06T 1/20* (2006.01)
*G06T 11/40* (2006.01)

(52) U.S. Cl.
CPC .............. *G06T 11/001* (2013.01); *G06T 1/20* (2013.01); *G06T 11/40* (2013.01); *G06T 2200/24* (2013.01)

(58) Field of Classification Search
CPC ......... G06T 11/001; G06T 1/20; G06T 11/40; G06T 2200/24
See application file for complete search history.

(56) References Cited

U.S. PATENT DOCUMENTS

| | | | | |
|---|---|---|---|---|
| 7,456,846 B1* | 11/2008 | King | ..................... | G06T 15/005 345/613 |
| 2006/0192788 A1* | 8/2006 | Stollnitz | ............... | G06T 15/503 345/592 |
| 2008/0094410 A1* | 4/2008 | Jiao | ........................ | G06T 15/503 345/592 |
| 2011/0285711 A1* | 11/2011 | Kilgard | ................. | G06T 11/203 345/426 |
| 2012/0281925 A1* | 11/2012 | Nystad | ...................... | G06T 9/00 382/232 |
| 2017/0357493 A1* | 12/2017 | Omachi | .................... | G06F 8/61 |
| 2017/0372455 A1* | 12/2017 | Winnemoeller | .......... | G06T 7/13 |
| 2018/0121391 A1* | 5/2018 | Beri | ....................... | G09G 5/377 |
| 2020/0242823 A1* | 7/2020 | Gehlaut | .................. | G06T 11/40 |

* cited by examiner

*Primary Examiner* — Sing-Wai Wu
*Assistant Examiner* — Khoa Vu
(74) *Attorney, Agent, or Firm* — FIG. 1 Patents

(57) ABSTRACT

In implementations of systems for generating blend objects from objects with pattern fills, a computing device implements a blend system to generate a source master texture using a first pattern fill of a source object and a destination master texture using a second pattern fill of the a destination object. First colors are sampled from the source master texture and second colors are sampled from the destination master texture. The blend system determines a blended pattern fill for the first pattern fill and the second pattern fill by combining the first colors and the second colors. The blend system generates an intermediate blend object for the source object and the destination object for display in a user interface based on the blended pattern fill.

20 Claims, 11 Drawing Sheets
(8 of 11 Drawing Sheet(s) Filed in Color)

800 ⟶

802
Generate a source master texture using a first pattern fill of a source object and a destination master texture using a second pattern fill of a destination object

804
Sample first colors from the source master texture and second colors from the destination master texture

806
Determine a blended pattern fill for the first pattern fill and the second pattern fill by combining the first colors and the second colors

808
Generate an intermediate blend object for the source object and the destination object for display in a user interface based on the blended pattern fill

*Fig. 8*

GENERATING BLEND OBJECTS FROM OBJECTS WITH PATTERN FILLS

BACKGROUND

A blend object is a type of object used in applications for digital content creation which is generated by interpolating between visual features (e.g., geometries and colors) of a source object and a destination object. Once generated, the blend object appears to visually transition between a geometry and colors of the source object and a geometry and colors of the destination object. For instance, the blend object is includable in digital content along with the source and destination objects or as a separate object that is independent of the source object and the destination object.

SUMMARY

Techniques and systems for generating blend objects from objects with pattern fills are described. In one example, a computing device implements a blend system to generate a source master texture using a first pattern fill of a source object and a destination master texture using a second pattern fill of a destination object. In some examples, the source master texture and the destination master texture are generated based on dimensions of the source object and dimensions of the destination object. For example, the source object and the destination object are to be blended as part of a blending operation and the source object and the destination object have dimensions that are different. In this example, the source master texture and the destination master texture have dimensions that are not different.

The blend system computes mipmaps based on the source master texture and the destination master texture. In an example, the blend system determines a blended pattern fill for the first pattern fill and the second pattern fill by sampling colors of the mipmaps of the source and destination master textures and combining the sampled colors. For instance, the blend system generates the intermediate blend object for display in a user interface based on the blended pattern fill. In one example, the intermediate blend object appears to visually transition from the source object to the destination object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 8 is a flow diagram depicting a procedure in an example implementation in which an intermediate blend object is generated for display in a user interface.

DETAILED DESCRIPTION

Figure 1:
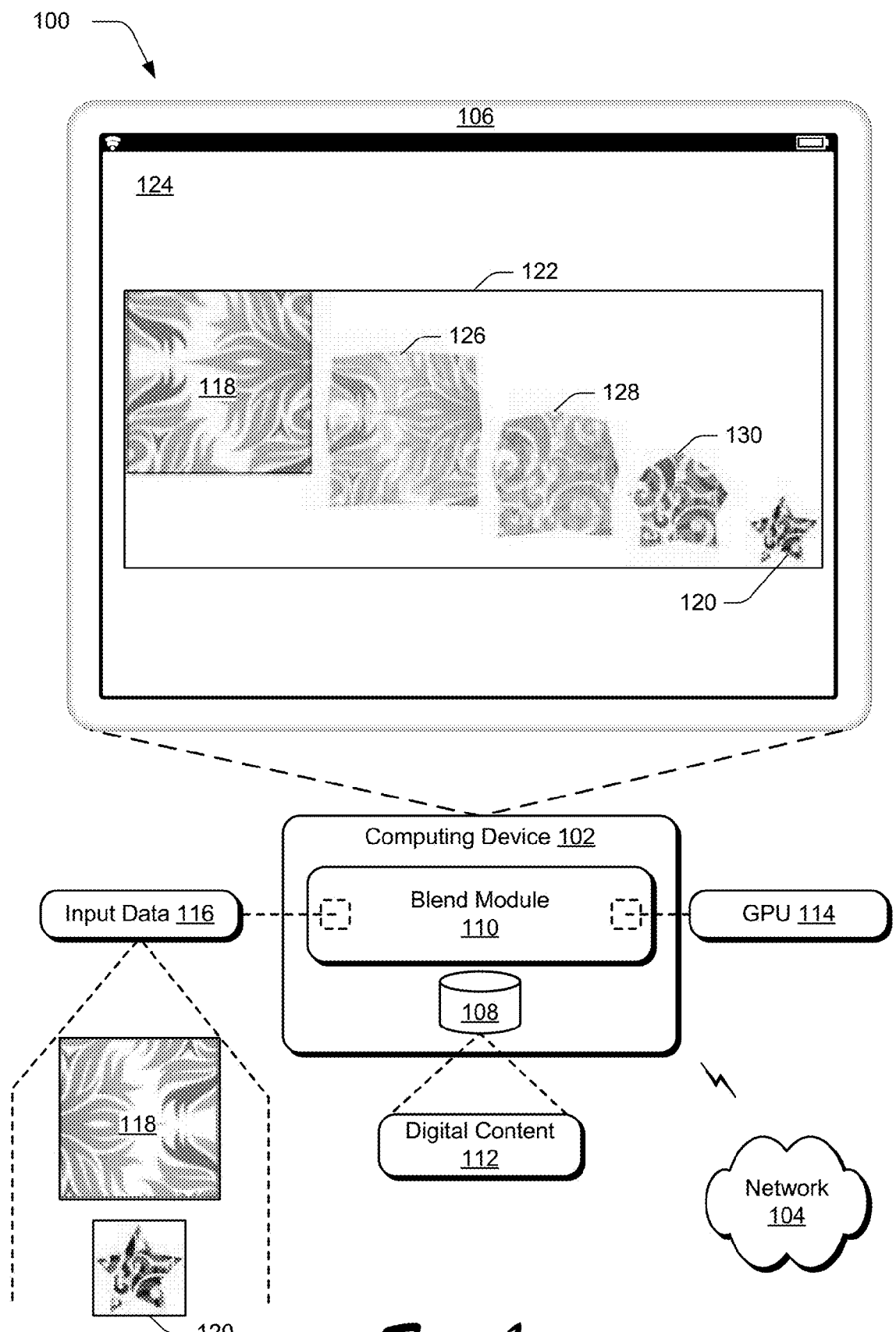
FIG. 1 is an illustration of an environment in an example implementation that is operable to employ digital systems and techniques for generating blend objects from objects with pattern fills as described herein.

Conventional systems are not capable of generating intermediate blend objects that appear to visually transition from a source object to a destination object if the source object or the destination object has a pattern fill. Instead, the conventional systems generate the intermediate blend objects for the source object and the destination object such that the intermediate blend objects only include colors of the destination object which is a shortcoming of the conventional systems. In order to overcome these limitations, techniques and systems are described for generating blend objects from objects with pattern fills.

In an embodiment, a computing device implements a blend system to receive input data describing a source object; a destination object; properties of a blend operation that generates an intermediate blend object for the source object and the destination object; and a pattern fill for the source object, the destination object, or both the source and destination objects. For example, the input data describes properties of the pattern fill such as a pattern cell (e.g., a basic graphic block replicated to fill object geometries), steps sizes for the pattern cell (e.g., horizontal and vertical spacing between replications of the pattern cell), a transformation matrix for the pattern cell (e.g., optional rotations and/or scalings applied to the pattern cell when filling object geometries), and so forth. In some embodiments, the blend system extracts data describing the properties of the pattern fill from the input data and then caches the extracted data.

The blend system processes the input data and/or the cached data to generate a source master texture for the source object and a destination master texture for the destination object based on dimensions of the source object and dimensions of the destination object. In one embodiment, the blend system identifies largest dimensions of the dimensions of the source object and the dimensions of the destination object, and the blend system generates the source master texture and the destination master texture as having dimensions equal to the largest dimensions. The blend system generates a number of mipmaps of the source master texture and the destination master texture based on a difference or a ratio between the dimensions of the source object and the dimensions of the destination object.

For example, the blend system includes or appends texture coordinates of the source master texture and the destination master texture in vertex buffer data that describes tessellated vertices of the intermediate blend object for the source object and the destination object. A vertex shader of a graphics processing unit (GPU) pipeline transmits the texture coordinates of the source master texture and the destination master texture to a fragment shader of the GPU pipeline. The fragment shader samples a first color from the source master texture or the mipmaps of the source master texture based on the texture coordinates of the source master texture. For instance, the fragment shader also samples a second color from the destination master texture or the mipmaps of the destination master texture based on the texture coordinates of the destination master texture.

The blend system (and/or the fragment shader) computes a color to assign to a pixel of the intermediate blend object based on a weighted combination of the first color and the second color. In an embodiment, the weighted combination is based on a number of intermediate blend objects to be generated for the source object and the destination object as part of the blend operation described by the input data. For example, the blend system generates the intermediate blend object for display in a user interface based on the color.

The intermediate blend object appears to visually transition from the source object to the destination object by depicting colors of the source object and colors of the destination object. Because of this improvement, it is possible for the described systems to generate intermediate blend objects from source objects and destination objects having pattern fills such that the intermediate blend objects appear more like the source objects, more like the destination objects, or as about an equal blend of the source objects and the destination objects in terms of color. This is not possible using conventional systems that are limited to generating blend objects that only include colors of the destination objects such that all of the blend objects appear more like the destination objects in terms of color. By overcoming this limitation, the described systems improve accuracy of blend objects generated from objects with pattern fills and expand functionality available for digital content creation.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a blend module 110. The storage device 108 is illustrated to include digital content 112 such as digital images, digital artwork, vector objects, etc.

The computing device 102 and/or the blend module 110 have access to a graphics processing unit (GPU) 114 which is representative of multiple GPUs 114 in some examples. In one example, the computing device 102 includes the GPU 114 in addition to a central processing unit (CPU). In another example, the GPU is available to the computing device 102 and the blend module 110 via the network 104. For example, the computing device 102 and the blend module 110 leverage the GPU 114 (e.g., GPU 114 computing kernels) for processing and rendering the digital content 112 and/or for processing data in series or parallel with the CPU such as in a CPU-GPU 114 framework. In an example, this includes leveraging multiple CPUs and/or multiple GPUs 114.

The blend module 110 is illustrated as having, receiving, and/or transmitting input data 116. For example, the input data 116 describes a source object 118 and a destination object 120 that are to be blended as part of a vector object blending operation. In this example, the vector object blending operation generates a number of blend objects for the source object 118 and the destination object 120 that appear to visually transition from the source object 118 to the destination object 120.

For instance, each of the blend objects has a geometry that is determined by interpolating between a geometry of the source object 118 and a geometry of the destination object 120 and colors determined based on colors of the source object 118 and colors of the destination object 120. As shown, the source object 118 has a square shaped geometry and colors defined by a first pattern fill that appears to depict leaves colored green and yellow. The destination object 120 has a star shaped geometry and colors defined by a second pattern fill that depicts dark brown colored swirls and light brown colored swirls such that the dark brown colored swirls wrap around the light brown colored swirls and the light brown colored swirls wrap around the dark brown colored swirls.

The blend module 110 processes the input data 116 to cache data describing the first pattern fill and the second pattern fill such as pattern cells (e.g., basic graphic blocks replicated to fill object geometries), steps sizes for the pattern cells (e.g., horizontal and vertical spacing between the pattern cells), transformation matrices for the pattern cells (e.g., optional rotations and/or scalings applied to the pattern cells when filling object geometries), and so forth. For instance, the blend module 110 processes the input data 116 to extract data describing a first pattern cell for the source object 118 (e.g., a tile type of hex by column), a horizontal spacing for the first pattern cell (e.g., 4 point), and a vertical spacing for the first pattern cell (e.g., 4 point). Similarly, the blend module 110 processes the input data 116 to extract data describing a second pattern cell for the destination object 120 (e.g., a tile type of grid), a horizontal spacing for the second pattern cell (e.g., 6 point), and a vertical spacing for the second pattern cell (e.g., 6 point).

For example, the blend module 110 leverages the extracted and cached data describing the first pattern fill and the second pattern fill to generate a source master texture for the source object 118 and a destination master texture for the destination object 120. To do so in one example, the blend module 110 identifies dimensions of the source object 118 and dimensions of the destination object 120. In this example, the dimensions of the source object 118 are greater than the dimensions of the destination object 120 and the blend module 110 uses the dimensions of the source object 118 as dimensions of the source master texture and as dimensions of the destination master texture. Accordingly, the source object 118 and the destination object 120 have different dimensions while the source master texture and the destination master texture have the same dimensions.

For example, in addition to generating the source master texture and the destination master texture, the blend module 110 generates mipmaps from the source master texture and mipmaps from the destination master texture based on a difference between the dimensions of the source object 118 and the dimensions of the destination object 120. In this example, the dimensions of the source object 118 are eight times greater than the dimensions of the destination object 120. Consider an example in which a first mipmap generated from a master texture has information included in the master texture and dimensions that are twice as small as dimensions of the master texture. Continuing this example, a second mipmap generated from the first mipmap has information included in the first mipmap and dimensions that are twice as small as the dimensions of the first mipmap. Similarly, a third mipmap generated from the second mipmap has information included in the second mipmap and dimensions that are twice as small as the dimensions of the second mipmap.

Returning to the example in which the dimensions of the source object 118 are eight times greater than the dimensions of the destination object 120, the blend module 110 generates three levels of mipmaps from the source master texture and three levels of mipmaps from the destination master texture. By generating the three levels of mipmaps from the master textures in this way, the blend module 110 is capable of sampling one of the mipmaps to determine a color of any particular blend object generated for the source object 118 and the destination object 120 without scaling a texture for the sampling. For example, this ensures that the particular blend object does not depict any aliasing effect after assigning the determined color to a pixel of the particular blend object.

The blend module 110 processes the input data 116 to identify a number of blend objects to be generated for the source object 118 and the destination object 120, and leverages the number of blend objects to compute colors for assigning to pixels of the blend objects. For example, the input data 116 describes three blend objects to be generated for the source object 118 and the destination object 120. The blend module 110 computes a color for each pixel of the three blend objects using a weighted combination of a first color sampled from the source master texture or a mipmap generated from the source master texture and a second color sampled from the destination master texture or a mipmap generated from the destination master texture.

In one example, the blend module 110 uses the colors computed for each pixel of the three blend objects in addition to a geometry interpolated for each of the three blend objects from the geometry of the source object 118 and the geometry of the destination object 120 to generate an output 122 of the vector object blending operation which is displayed in a user interface 124 of the display device 106.

As shown, the output 122 includes the source object 118, the destination object 120, and intermediate blend objects 126-130. For example, intermediate blend object 126 has a visual appearance (e.g., a geometry and color assignments to pixels within the geometry) which appears to be more similar to the source object 118 than the destination object 120.

As shown, the intermediate blend object 126 includes more colors that are green and yellow than colors that are brown. Similarly, intermediate blend object 130 has a visual appearance (e.g., a geometry and color assignments to pixels within the geometry) which appears to be more similar to the destination object 120 than the source object 118. However, intermediate blend object 128 has a visual appearance (e.g., a geometry and color assignments to pixels within the geometry) that does not appear to be more similar to either the source object 118 or the destination object 120. Instead, the intermediate blend object 128 appears to be about equally similar to both the source object 118 and the destination object 120.

Generating the intermediate blend objects 126-130 from the source object 118 having the first pattern fill and the destination object 120 having the second pattern fill is not possible using conventional systems. This is because conventional systems are limited to generating blend objects having a pattern fill of only one of the source object 118 or the destination object 120 (e.g., the pattern fill of the destination object 120 as a topmost layer). Accordingly, conventional systems are not capable of generating the intermediate blend object 128 that appears to be about equally visually similar to both the source object 118 and the destination object 120.

Figure 2:
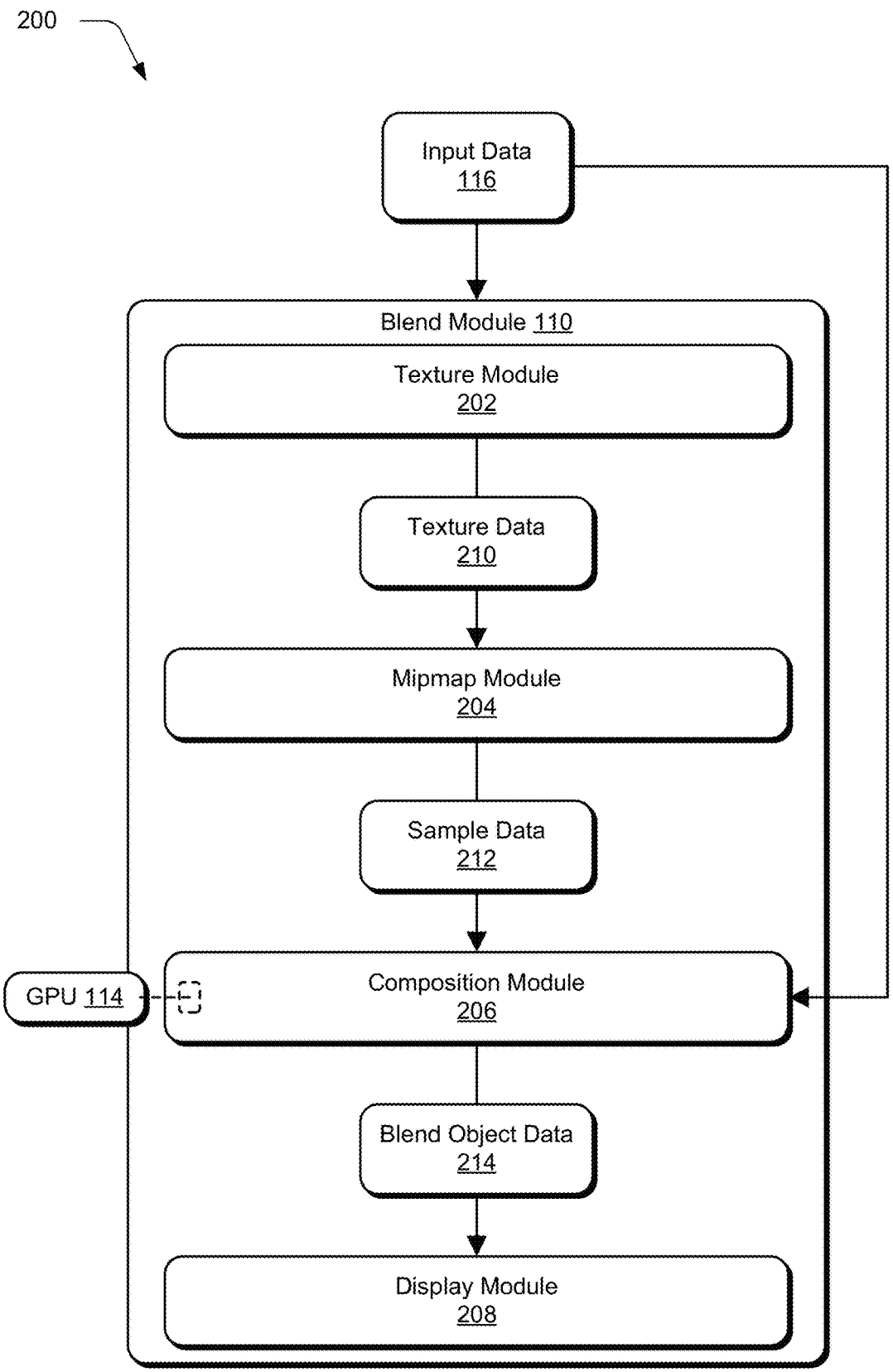
FIG. 2 depicts a system in an example implementation showing operation of a blend module for generating blend objects from objects with pattern fills.

FIG. 2 depicts a system 200 in an example implementation showing operation of a blend module 110. The blend module 110 is illustrated to include a texture module 202, a mipmap module 204, a composition module 206, and a display module 208. For example, the texture module 202 receives and processes the input data 116 to generate texture data 210. In an example, the texture module 202 receives the input data 116 as describing the source object 118 that has the square shaped geometry and colors defined by the first pattern fill that appears to depict leaves colored green and yellow and the destination object 120 that has the star shaped geometry and colors defined by the second pattern fill that depicts dark brown colored swirls and light brown colored swirls. In this example, the input data 116 describes the source object 118 and the destination object 120 that are to be blended as part of a vector object blending operation and also properties of the vector object blending operation such as a number of blend objects to be generated as an output of the vector object blending operation.

Figure 3:
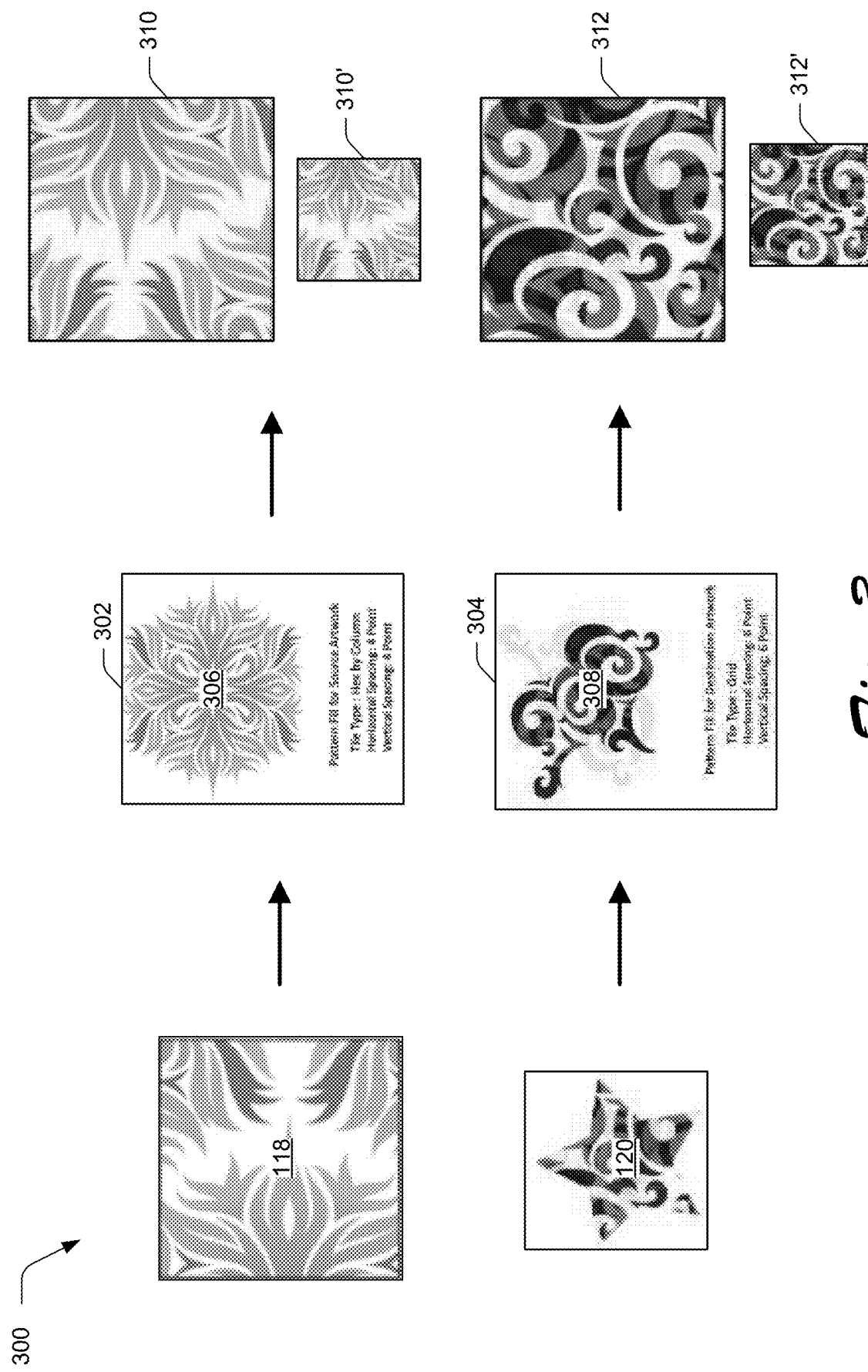
FIG. 3 illustrates a representation of generating master textures for objects with pattern fills.

FIG. 3 illustrates a representation 300 of generating master textures for objects with pattern fills. For instance, the texture module 202 processes the input data 116 to extract metadata and pattern fill data 302 for the source object 118 and also to extract metadata and pattern fill data 304 for the destination object 120. As shown in the representation 300, the metadata and pattern fill data 302 describes a geometry of the source object 118, dimensions of the source object 118, a pattern cell 306 for the first fill pattern, a tile type for the pattern cell 306 as hex by column, horizontal spacing between instances of the pattern cell 306 as 4 points, and vertical spacing between the instances of the pattern cell 306 as 4 points. In one example, the texture module 202 caches the metadata and pattern fill data 302 by writing the metadata and pattern fill data 302 to the storage device 108.

As further shown in the representation 300, the metadata and pattern fill data 304 describes a geometry of the destination object 120, dimensions of the destination object 120, a pattern cell 308 for the second fill pattern, a tyle type for the pattern cell 308 as grid, horizontal spacing between instances of the pattern cell 308 as 6 points, and vertical spacing between the instances of the pattern cell 308 as 6 points. For instance, the texture module 202 caches the metadata and pattern fill data 304 by writing the metadata and pattern fill data 304 to the storage device 108. In an example in which only one of the source object 118 and the destination object 120 includes a pattern fill, the texture module 202 only caches metadata and pattern fill data for the source object 118 or the destination object 120 that includes the pattern fill.

In one example, texture module 202 processes the input data 116 or the metadata and pattern fill data 302 to determine dimensions of the source object 118. Similarly, the texture module 202 processes the input data 116 or the metadata and pattern fill data 304 to determine dimensions of the destination object 120. The texture module 202 compares the dimensions of the source object 118 to the dimensions of the destination object 120 and identifies that the dimensions of the source object 118 are larger than the dimensions of the destination object 120 based on the comparison.

The texture module 202 uses the dimensions of the source object 118 as dimensions of a source master texture 310 which the texture module 202 generates based on the metadata and pattern fill data 302. For example, the texture module 202 also uses the dimensions of the source object 118 (which are larger than the dimensions of the destination object 120) as dimensions of a destination master texture 312 which the texture module 202 generates based on the metadata and pattern fill data 304. Since the source master texture 310 and the destination master texture 312 both have the dimensions of the source object 118, any blend object generated by blending the source object 118 and the destination object 120 has dimensions which are less than the dimensions of the source master texture 310 and the destination master texture 312.

The texture module 202 generates the texture data 210 as describing the source master texture 310, the destination master texture 312, and a difference between the dimensions of the source object 118 and the dimensions of the destination object 120. For instance, the mipmap module 204 receives and processes the texture data 210 to generate sample data 212. To do so in one example, the mipmap module 204 uses the difference between the dimensions of the source object 118 and the destination object 120 to determine a number of mipmaps to generate from the source master texture 310 and from the destination master texture 312.

In an example, a first mipmap 310' generated from the source master texture 310 includes texture data of the source master texture 310 and has dimensions which are half of a size of the dimensions of the source master texture 310. In this example, if the dimensions of a largest of the source object 118 and the destination object 120 are less than two times (e.g., 1.5 times) greater than the dimensions of a smallest of the source object 118 and the destination object 120, then the source master texture 310 and the first mipmap 310' are usable to sample texture/color values contributed by the source object 118 for any blend object generated by blending the source object 118 and the destination object 120 as illustrated in the representation 300. In another example, if the dimensions of the largest of the source object 118 and the destination object 120 are more than two times (e.g., 2.5 times) greater than the dimensions of the smallest of the source object 118 and the destination object 120, then the mipmap module 204 generates a second mipmap from the first mipmap 310' that includes texture data of the first mipmap 310' and has dimensions which are half of a size of the dimensions of the first mipmap 310'. In this example, the master texture 310, the first mipmap 310', and the second mipmap are usable to sample texture/color values contributed by the source object 118 for any blend object generated by blending the source object 118 and the destination object 120.

For example, if the dimensions of the largest of the source object 118 and the destination object 120 are more than four times (e.g., 4.5 times) greater than the dimensions of the smallest of the source object 118 and the destination object 120, then the mipmap module 204 generates a third mipmap from the second mipmap that includes texture data of the second mipmap and has dimensions which are half of a size of the dimensions of the second mipmap. For instance, if the dimensions of the largest of the source object 118 and the destination object 120 are eight times greater than the dimensions of the smallest of the source object 118 and the destination object 120, then the master texture 310, the first mipmap 310', the second mipmap, and the third mipmap are usable to sample texture/color values contributed by the source object 118 for any blend object generated by blending the source object 118 and the destination object 120. However, if the dimensions of the largest of the source object 118 and the destination object 120 are more than eight times greater than the dimensions of the smallest of the source object 118 and the destination object 120, then the mipmap module 204 generates a fourth mipmap from the third mipmap that includes texture data of the third mipmap and has dimensions which are half of a size of the dimensions of the third mipmap, and so forth.

After determining the number of mipmaps to generate from the source master texture 310 and from the destination master texture 312 in this manner, the mipmap module 204 generates the determined number of mipmaps from both the source master texture 310 and the destination master texture 312. In the illustrated example, the mipmap module 204 generates the first mipmap 310' from the source master texture 310 and the mipmap module 204 generates a first mipmap 312' from the destination master texture 312. The mipmap module 204 generates the sample data 212 as describing the source master texture 310, the first mipmap 310', the destination master texture 312, and the first mipmap 312'. As shown in FIG. 2, the composition module 206 receives the sample data 212 and the input data 116, and the composition module 206 processes the sample data 212 and/or the input data 116 to generate blend object data 214.

Figure 4:
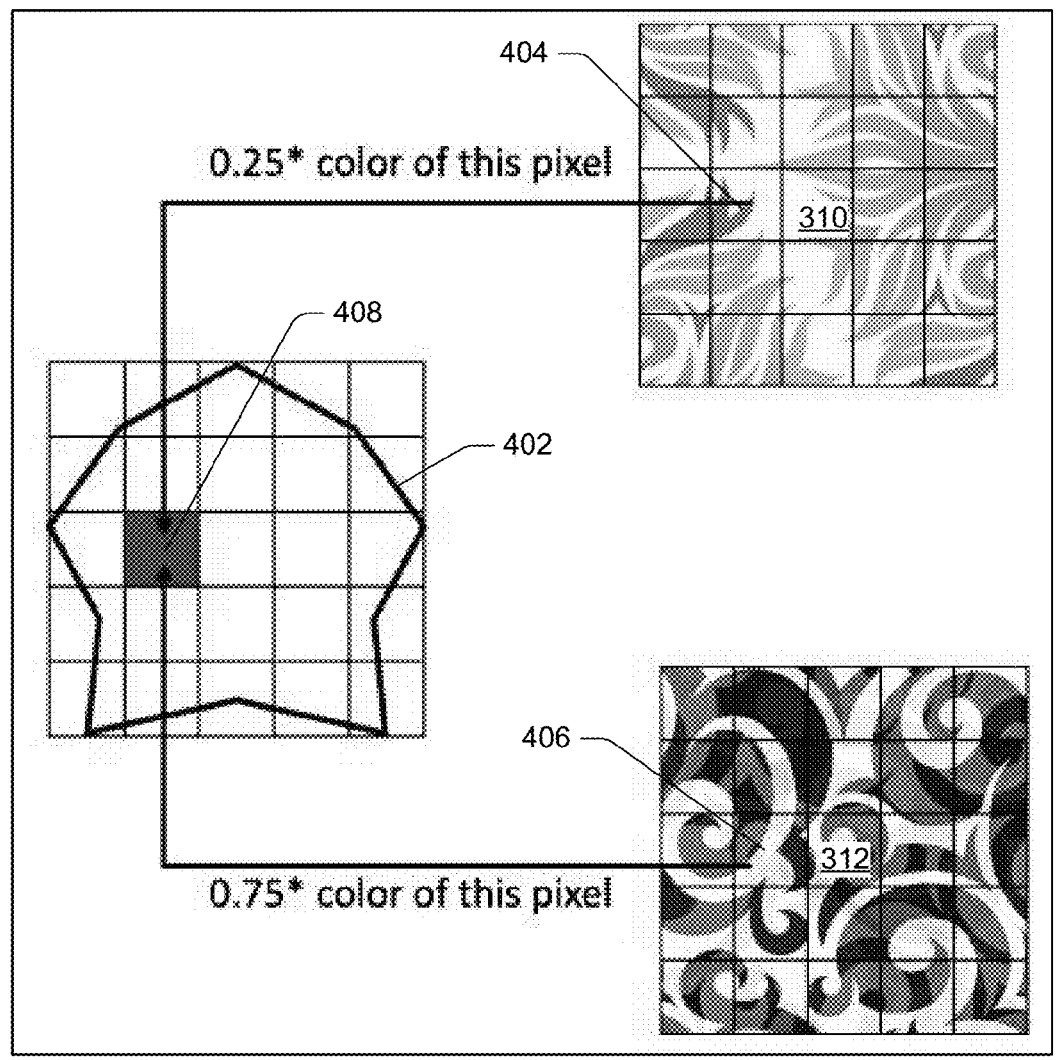
FIG. 4 illustrates a representation of assigning a color to a pixel of an intermediate blend object.

FIG. 4 illustrates a representation 400 of assigning a color to a pixel of an intermediate blend object. As shown, the representation 400 includes a geometry 402 of the intermediate blend object and the composition module 206 samples a pixel 404 of the source master texture 310 and a pixel 406 of the destination master texture 312 to determine a color to assign to a pixel 408 of the intermediate blend object. Consider an example in which the composition module 206 processes the input data 116 to identify a number of blend objects n to be generated as an output of a vector object blending operation that blends the source object 118 and the destination object 120. In this example, for the kth intermediate blend object, the composition module 206 contributes a $$\left(1.0 - \left(\frac{k}{n+1}\right)\right)$$

fraction of a color of the pixel 404 of the source master texture 310 and contributes a $$\left(\frac{k}{n+1}\right)$$

fraction of a color of the pixel 406 of the destination master texture 312 to the color of the pixel 408 of the intermediate blend object. In one example, this is representable as:

$$\text{color} = \left(1.0 - \left(\frac{k}{n+1}\right)\right) * texlFetch(S, T_k) + \left(\frac{k}{n+1}\right) * texlFetch(D, T_k)$$

where: color is the color of the pixel 408; $T_k$ represents texture coordinates corresponding to any pixel for the kth intermediate blend object; S represents the source master texture 310; and D represents the destination master texture 312.

It is to be appreciated that the above representation for calculating the color of the pixel 408 is one example, and the color of the pixel 408 is calculated differently in other examples. In some of these other examples, relative amounts of the color of the pixel 408 contributed by the pixel 404 and the pixel 406 are computed differently, the relative amounts contributed by the pixel 404 and the pixel 406 are combined differently, etc. In an example in which either the source object 118 or the destination object 120 does not include a pattern fill and instead includes a constant color C, then a master texture for that object is a single texel sized texture on which texelFetch returns C.

Figure 5:
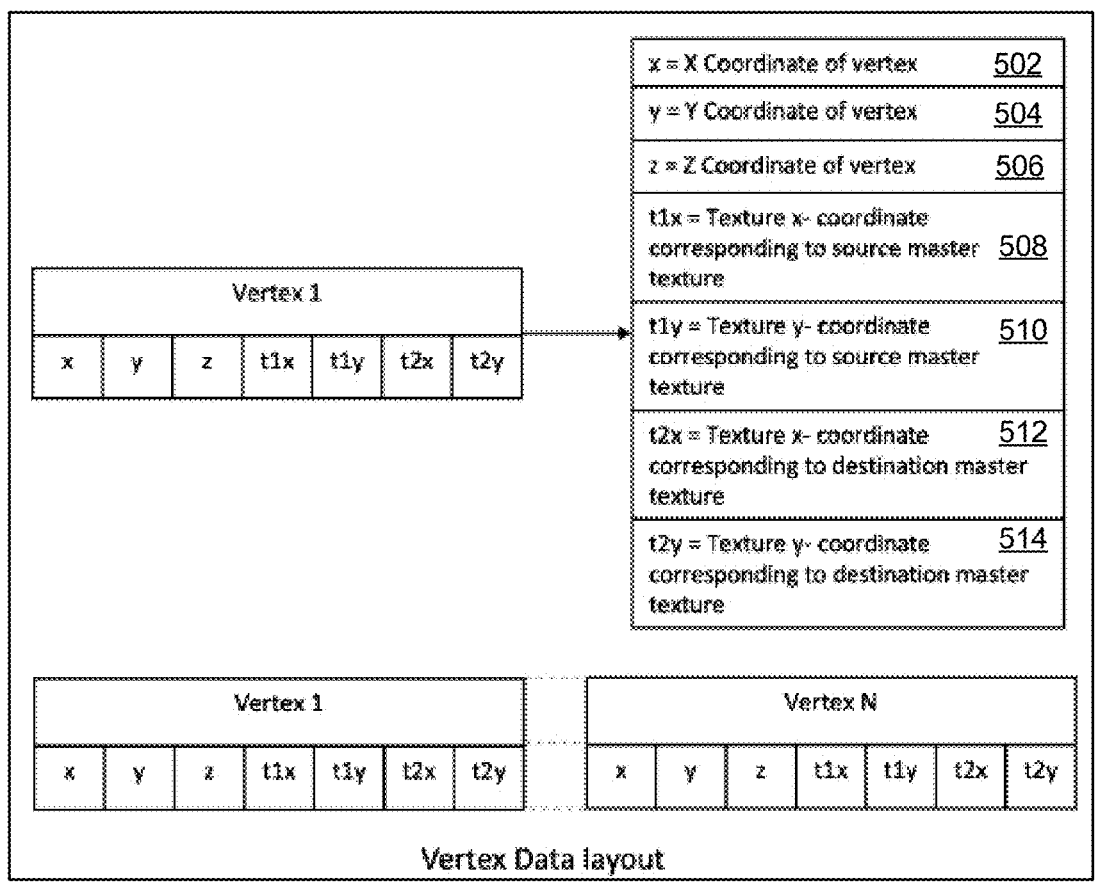
FIG. 5 illustrates a representation of vertex buffer data describing texture coordinates of a source master texture and a destination master texture.

The composition module 206 is illustrated as having access to the GPU 114 which is representative of multiple GPUs 114 in some examples. For example, because the source object 118, the destination object 120, the source master texture 310, the first mipmap 310', the destination master texture 312, and the first mipmap 312' are generated before issuing any draw calls to the GPU 114, it is possible to modify a vertex buffer on which the blend module 110 issues the draw calls. FIG. 5 illustrates a representation 500 of vertex buffer data describing texture coordinates of a source master texture and a destination master texture. For instance, the composition module 206 appends texture coordinates $T_k$ of the source master texture 310 and the destination master texture 312 to corresponding vertex positions described by tessellated vertex data included in the vertex buffer data. In one example, the vertex buffer data has an organization or a layout that includes an X coordinate 502 of a vertex, a Y coordinate 504 of the vertex, a Z coordinate 506 of the vertex, a texture X coordinate 508 corresponding to the source master texture 310, a texture Y coordinate 510 corresponding to the source master texture 310, a texture X coordinate 512 corresponding to the destination master texture 312, and a texture Y coordinate 514 corresponding to the destination master texture 312.

Figure 6:
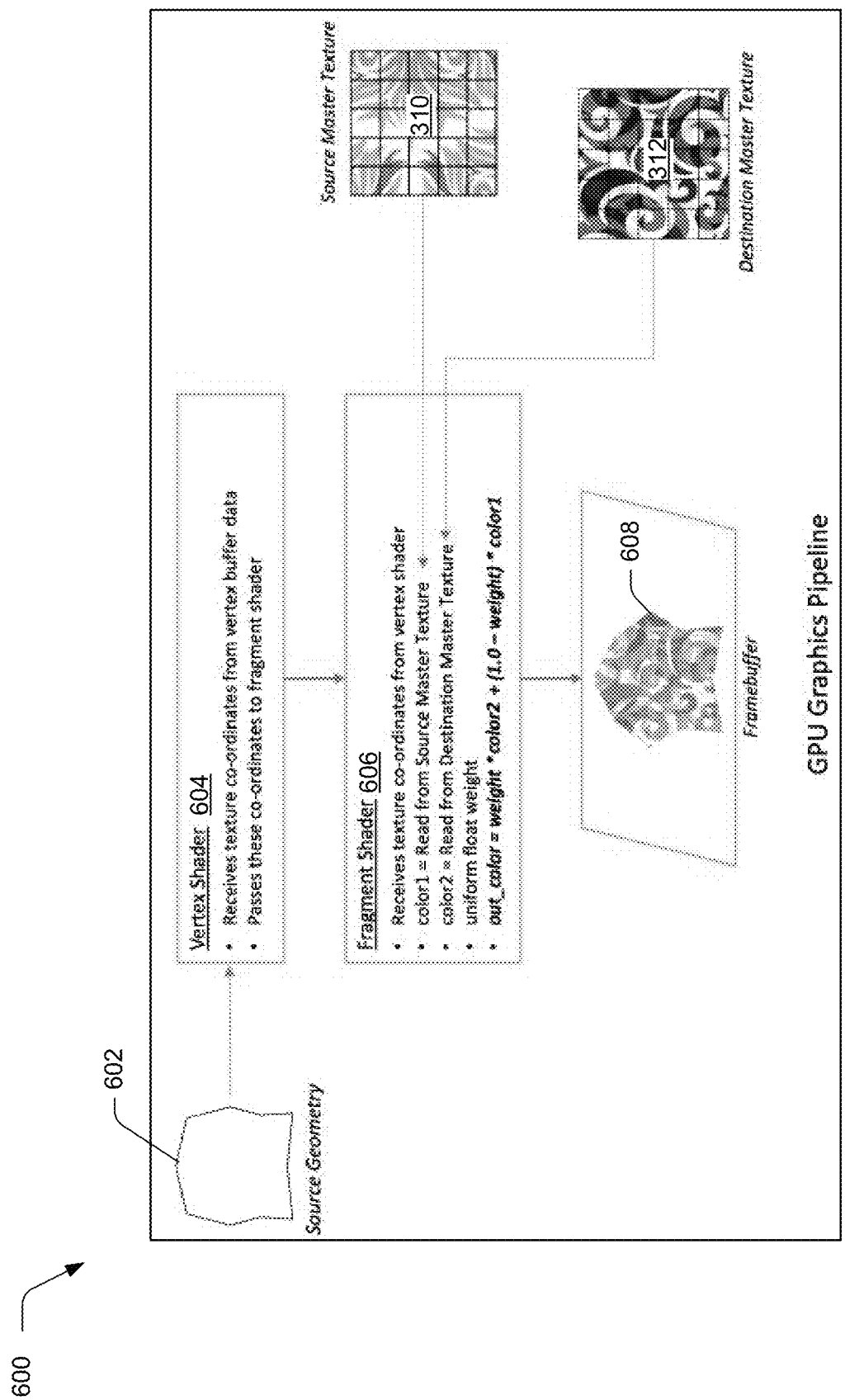
FIG. 6 illustrates a representation of a vertex shader and a fragment shader of a graphics processing unit pipeline.

FIG. 6 illustrates a representation 600 of a vertex shader and a fragment shader of a graphics processing unit pipeline. As shown, the representation 600 includes a geometry 602 of an intermediate blend object for the source object 118 and the destination object 120. For example, a vertex shader 604 of the GPU 114 pipeline receives the vertex buffer data as describing the texture coordinates $T_k$ of the source master texture 310 and the destination master texture 312 added to the vertex buffer data by the composition module 206. The vertex shader 604 communicates the texture coordinates $T_k$ of the source master texture 310 and the destination master texture 312 to a fragment shader 606 of the GPU 114 pipeline along with uniform data.

For instance, the fragment shader 606 receives the texture coordinates $T_k$ and samples a first color from the source master texture 310 (or the first mipmap 310') and samples a second color from the destination master texture 312 (or the first mipmap 312'). In order to determine whether to sample from the master textures 310, 312 or the first mipmaps 310', 312', dimensions of the geometry 602 are referenced and compared to the dimensions of the master textures 310, 312 and the first mipmaps 310', 312'. Since the first mipmaps 310', 312' (and any additional mipmaps) are precomputed, the blend module 110 is capable of generating blend objects having relatively low dimensions without an aliasing effect by sampling the first mipmaps 310', 312' or any additional mipmaps.

For example, the fragment shader 606 applies a weight to the first color and a weight to the second color and combines the weighted first and second colors to generate a pattern fill 608 for the intermediate blend object. In this example, the fragment shader 606 generates a pattern fill for each geometry of each intermediate blend object to be generated for the source object 118 and the destination object 120 described by the input data 116. The composition module 206 generates the blend object data 214 as describing the pattern fill for each geometry of each intermediate blend object.

Figure 7:
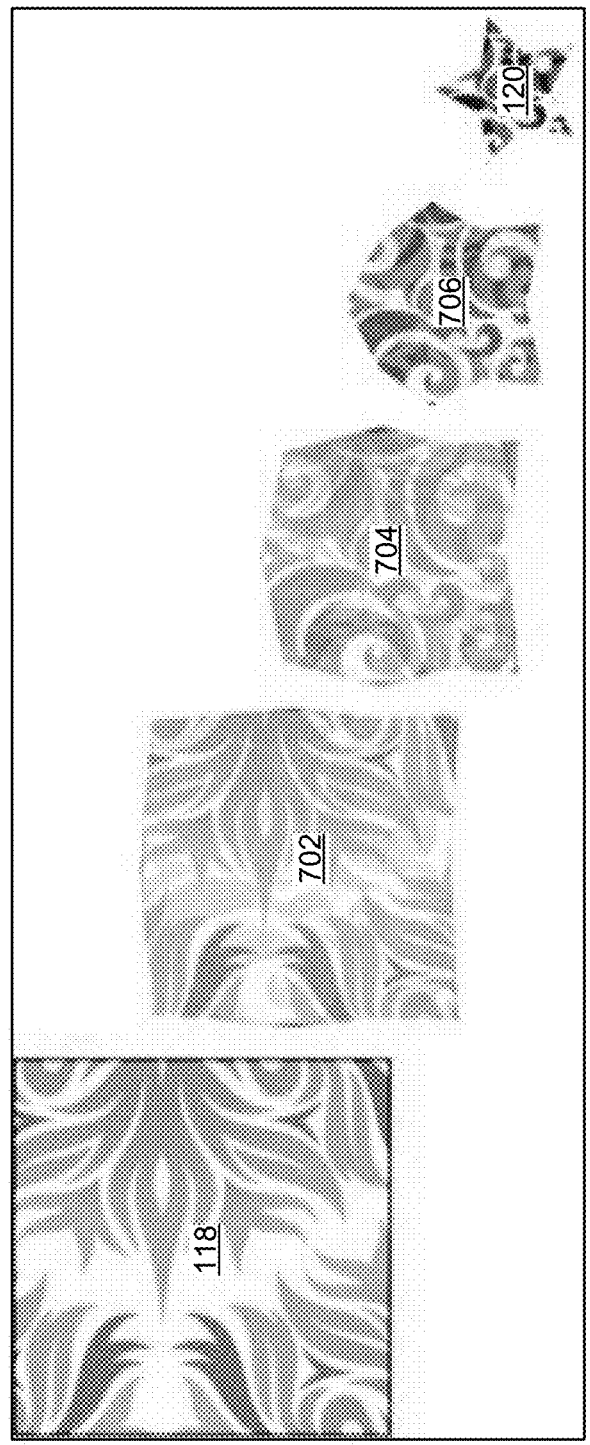
FIG. 7 illustrates a representation of intermediate blend objects generated from objects with pattern fills.

FIG. 7 illustrates a representation 700 of intermediate blend objects generated from objects with pattern fills. For example, the display module 208 receives and processes the blend object data 214 to generate intermediate blend objects 702-706 for the source object 118 and the destination object 120. The intermediate blend objects 702-706 collectively appear to visually transition from the source object 118 to the destination object 120. In one example, the display module 208 generates the intermediate blend objects 702-706 for display in the user interface 124 of the display device 106. As shown, intermediate blend object 702 has a geometry that is interpolated between the geometry of the source object 118 and the geometry of the destination object 120. For instance, the geometry of the intermediate blend object 702 appears to be more visually similar to the geometry of the source object 118 than the geometry of the destination object 120. As further shown, the intermediate blend object 702 has colors that appear to be more visually similar to colors of the source object 118 than colors of the destination object 120.

Intermediate blend object 704 has a geometry that is interpolated between the geometry of the source object 118 and the geometry of the destination object 120 and the intermediate blend object's 704 geometry appears to be about equally visually similar to the geometry of the source object 118 and the geometry of the destination object 120. Similarly, the intermediate blend object 704 has colors that appear to be about equally visually similar to the colors of the source object 118 and the colors of the destination object 120. Intermediate blend object 706 also has a geometry that is interpolated between the geometry of the source object 118 and the geometry of the destination object 120. For example, the geometry of the intermediate blend object 706 appears to be more visually similar to the geometry of the destination object 120 than the geometry of the source object 118. Colors of the intermediate blend object 706 appear to be more visually similar to the colors of the destination object 120 than the colors of the source object 118. For instance, each of the intermediate blend objects 702-706 includes a pattern fill which appears to blend the pattern fill for the source object 118 and the pattern fill for the destination object 120. This is not possible using conventional systems which are limited to generating blend objects as having the pattern fill of the destination object 120.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7. FIG. 8 is a flow diagram depicting a procedure 800 in an example implementation in which an intermediate blend object is generated for display in a user interface.

A source master texture is generated using a first pattern fill of a source object and a destination master texture is generated using a second pattern fill of a destination object (block 802). In one example, the computing device 102 implements the blend module 110 to generate the source master texture and the destination master texture. First colors are sampled from the source master texture and second colors are sampled from the destination master texture (block 804). For example, the blend module 110 samples the first colors and the second colors.

A blended pattern fill is determined for the first pattern fill and the second pattern fill by combining the first colors and the second colors (block 806). In an example, the computing device 102 implements the blend module 110 to determine the blended pattern fill. An intermediate blend object is generated for the source object and the destination object for display in a user interface based on the blended pattern fill (block 808). In some examples, the blend module 110 generates the intermediate blend object for display in the user interface.

Figure 9:
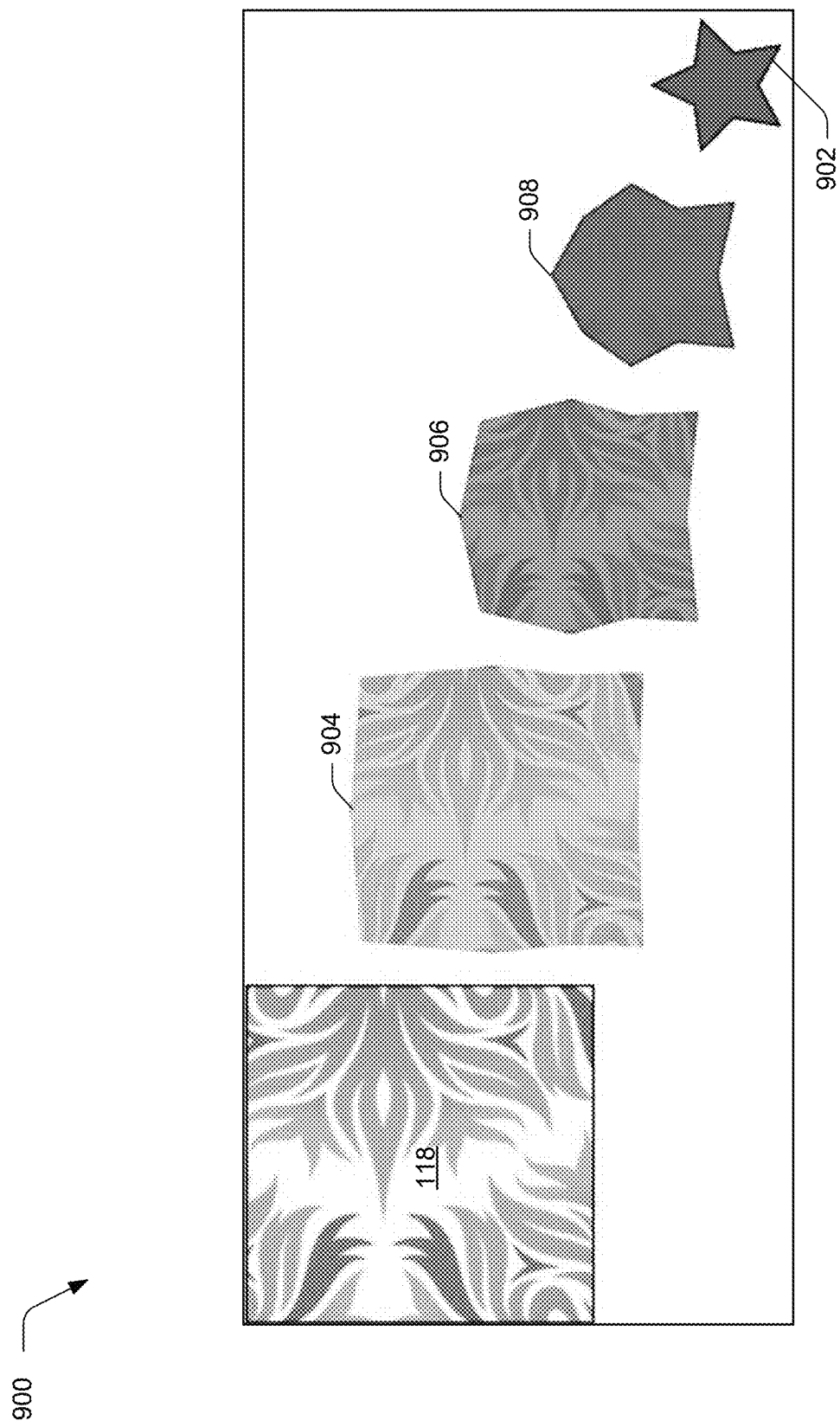
FIG. 9 illustrates a representation of intermediate blend objects generated from a source object with a pattern fill and a destination object with a constant fill color.

FIG. 9 illustrates a representation 900 of intermediate blend objects generated from a source object with a pattern fill and a destination object with a constant fill color. As shown, the representation 900 includes the source object 118 which has the square shaped geometry and the pattern fill that appears to depict leaves colored green and yellow. The representation 900 also includes a destination object 902 which has the star shaped geometry and a constant pink fill color.

For example, the computing device 102 implements the blend module 110 to generate intermediate blend objects 904-908 for the source object 118 and the destination object 902. In this example, because the destination object 902 does not include a pattern fill and instead includes a constant color C, a master texture for that destination object 902 is a single texel sized texture on which texelFetch returns C which is pink. Continuing this example, the destination object 902 has a same geometry as the destination object 120 which causes intermediate blend object 904 to have a same geometry as the intermediate blend object 702; intermediate blend object 906 to have a same geometry as the intermediate blend object 704; and intermediate blend object 908 to have a same geometry as the intermediate blend object 706.

Colors of the intermediate blend object 904 are more similar to the colors of the source object 118 than the constant color of the destination object 902. For instance, colors of the intermediate blend object 906 are about equally similar to the colors of the source object 118 and the constant color of the destination object 902. Colors of the intermediate blend object 908 are more similar to the constant color of the destination object 902 than the colors of the source object 118. As shown, the blend objects 904-908 appear to visually transition from the source object 118 to the destination object 902.

Figure 10:
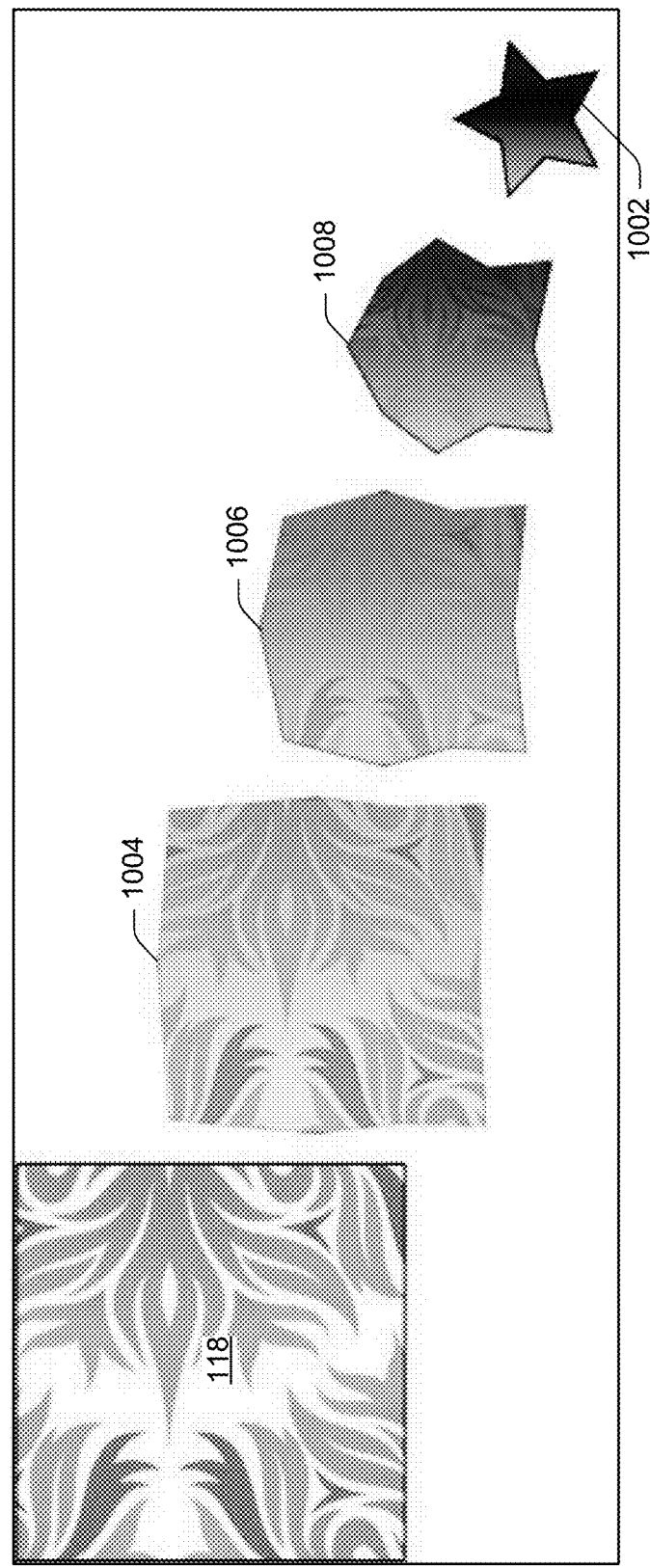
FIG. 10 illustrates a representation of intermediate blend objects generated from a source object with a pattern fill and a destination object with a gradient fill.

FIG. 10 illustrates a representation 1000 of intermediate blend objects generated from a source object with a pattern fill and a destination object with a gradient fill. The representation 1000 includes the source object 118 and a destination object 1002 that has the star shaped geometry and colors defined by a linear gradient that blends between a teal color and a burgundy color within the star shaped geometry. For instance, the representation 1000 also includes intermediate blend objects 1004-1008 generated for the source object 118 and the destination object 1002.

Intermediate blend object 1004 has a same geometry as the intermediate blend object 702; intermediate blend object 1006 has a same geometry as the intermediate blend object 704; and intermediate blend object 1008 has a same geometry as the intermediate blend object 706. The intermediate blend object 1004 has colors that are more similar to colors of the source object 118 than the colors defined by the linear gradient of the destination object 1002. The intermediate blend object 1006 has colors that are about equally similar to the colors of the source object 118 and the colors defined by the linear gradient of the destination object 1002. As shown in FIG. 10, the intermediate blend object 1008 has colors that are more similar to the colors defined by the linear gradient of the destination object 1002 than the colors of the source object 118.

Example System and Device

Figure 11:
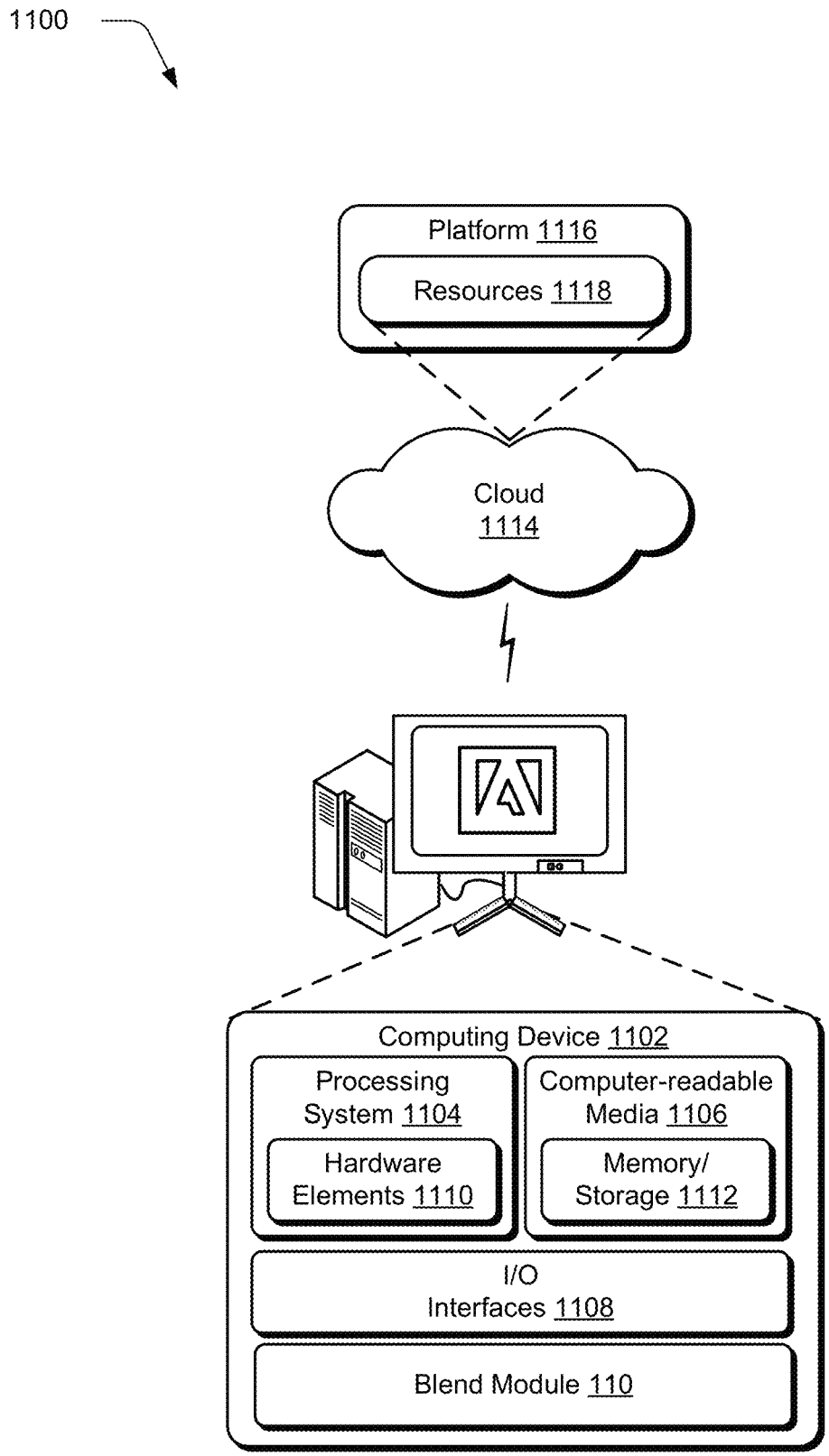
FIG. 11 illustrates an example system that includes an example computing device that is representative of one or more computing systems and/or devices for implementing the various techniques described herein.

FIG. 11 illustrates an example system 1100 that includes an example computing device that is representative of one or more computing systems and/or devices that are usable to implement the various techniques described herein. This is illustrated through inclusion of the blend module 110. The computing device 1102 includes, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that are configured as processors, functional blocks, and so forth. This includes example implementations in hardware as an application specific integrated circuit or other logic device formed using one or more semiconductors. The hardware elements 1110 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1106 is illustrated as including memory/storage 1112. The memory/storage 1112 represents memory/storage capacity associated with one or more computer-readable media. In one example, the memory/storage 1112 includes volatile media (such as random access memory (RAM)) and/or nonvolatile media (such as read only memory (ROM), Flash memory, optical disks, magnetic disks, and so forth). In another example, the memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1110. For example, the computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supportable by various configurations of the computing device 1102 and are not limited to the specific examples of the techniques described herein. This functionality is also implementable entirely or partially through use of a distributed system, such as over a "cloud" 1114 as described below.

The cloud 1114 includes and/or is representative of a platform 1116 for resources 1118. The platform 1116 abstracts underlying functionality of hardware (e.g., servers) and software resources of the cloud 1114. For example, the resources 1118 include applications and/or data that are utilized while computer processing is executed on servers that are remote from the computing device 1102. In some examples, the resources 1118 also include services provided over the Internet and/or through a subscriber network, such as a cellular or Wi-Fi network.

The platform 1116 abstracts the resources 1118 and functions to connect the computing device 1102 with other computing devices. In some examples, the platform 1116 also serves to abstract scaling of resources to provide a corresponding level of scale to encountered demand for the resources that are implemented via the platform. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

What is claimed is:

1. A method comprising:
    generating, by a processing device, a source master texture using a first pattern fill of a source object and a destination master texture using a second pattern fill of a destination object;
    sampling, by the processing device, first colors from a first mipmap computed based on the source master texture and second colors from a second mipmap computed based on the destination master texture;
    determining, by the processing device, a blended pattern fill as a visual combination of the first pattern fill and the first colors and the second pattern fill, a color of a pixel for the blended pattern fill being based on a weighted combination of the first colors and the second colors and the second colors; and
    generating, by the processing device, an intermediate blend object for the source object and the destination object for display in a user interface based on the blended pattern fill.

2. The method as described in claim 1, wherein at least one of the first pattern fill or the second pattern fill includes a graphic block and a pattern cell of the graphic block to fill the source object or the destination object, respectively.

3. The method as described in claim 1, wherein the source master texture and the destination master texture are generated based on dimensions of the source object and dimensions of the destination object.

4. The method as described in claim 3, wherein the dimensions of the source object are different from the dimensions of the destination object and dimensions of the source master texture are not different from dimensions of the destination master texture.

5. The method as described in claim 4, wherein the dimensions of the source master texture are equal to at least one of the dimensions of the source object or the dimensions of the destination object.

6. The method as described in claim 1, wherein the weighted combination is based on a number of intermediate blend objects to be generated for the source object and the destination object.

7. The method as described in claim 1, further comprising:
    including texture coordinates of the source master texture and the destination master texture in a vertex buffer of a graphics processing unit; and
    determining the blended pattern fill based on the texture coordinates.

8. The method as described in claim 1, wherein the first colors and the second colors are sampled by a fragment shader of a graphics processing unit.

9. A system comprising:
    a memory component; and
    a processing device coupled to the memory component, the processing device to perform operations comprising:
        generating a source master texture for a source object and a destination master texture for a destination object based on dimensions of the source object and dimensions of the destination object;
        computing mipmaps based on the source master texture and the destination master texture;
        determining a color of a pixel for an intermediate blend object based on a weighted combination of a first color and a second color to be generated for the source object and the destination object, the first color being sampled from a first mipmap computed based on the source master texture and the second color being sampled from a second mipmap computed based on the destination master texture; and
        generating the intermediate blend object for display in a user interface based on the color.

10. The system as described in claim 9, wherein the operations further comprise:
    including texture coordinates of the source master texture and the destination master texture in a vertex buffer of a graphics processing unit; and
    determining the color of the pixel for the intermediate blend object based on the texture coordinates.

11. The system as described in claim 9, wherein at least one of the source object or the destination object includes a pattern fill.

12. The system as described in claim 9, wherein the operations further comprise generating the color based on a number of intermediate blend objects to be generated for the source object and the destination object.

13. The system as described in claim 9, wherein the dimensions of the source object are different from the dimensions of the destination object and dimensions of the source master texture are not different from dimensions of the destination master texture.

14. A non-transitory computer-readable storage medium storing executable instructions, which when executed by a processing device, cause the processing device to perform operations comprising:
    receiving input data describing a source object and a destination object;
    generating a source master texture for the source object and a destination master texture for the destination object based on the input data;

determining a color of a pixel for an intermediate blend object to be generated for the source object and the destination object based on the source master texture and the destination master texture a weighted combination of a first color and a second color, the first color being sampled from a first mipmap computed based on the source master texture and the second color being sampled from a second mipmap computed based on the destination master texture; and generating the intermediate blend object, wherein the geometry of the intermediate blend object is interpolated between the geometry of the source object and the geometry of the destination object.

15. The non-transitory computer-readable storage medium as described in claim 14, wherein the color of the pixel is determined by sampling a first color of the source master texture and a second color of the destination master texture.

16. The non-transitory computer-readable storage medium as described in claim 14, wherein at least one of the source object or the destination object includes a pattern fill that includes a graphic block and a pattern cell of the graphic block to fill the source object or the destination object, respectively.

17. The non-transitory computer-readable storage medium as described in claim 14, wherein dimensions of the source object are different from dimensions of the destination object and dimensions of the source master texture are not different from dimensions of the destination master texture.

18. The non-transitory computer-readable storage medium as described in claim 14, wherein the operations further comprise:

including texture coordinates of the source master texture and the destination master texture in a vertex buffer of a graphics processing unit; and determining the color of the pixel for the blend object based on the texture coordinates.

19. The non-transitory computer-readable storage medium as described in claim 14, wherein the weighted combination is based on a number of intermediate blend objects to be generated for the source object and the destination object.

20. The non-transitory computer-readable storage medium as described in claim 14, wherein the first colors and the second colors are sampled by a fragment shader of a graphics processing unit.

* * * * *